Oct. 6, 1931.   L. H. WHEELER   1,825,708
DEPTH GAUGE AND PUMP
Filed May 2, 1927   2 Sheets-Sheet 1

Inventor:
Leonard H. Wheeler.
by Burton & Burton
his Attorneys.

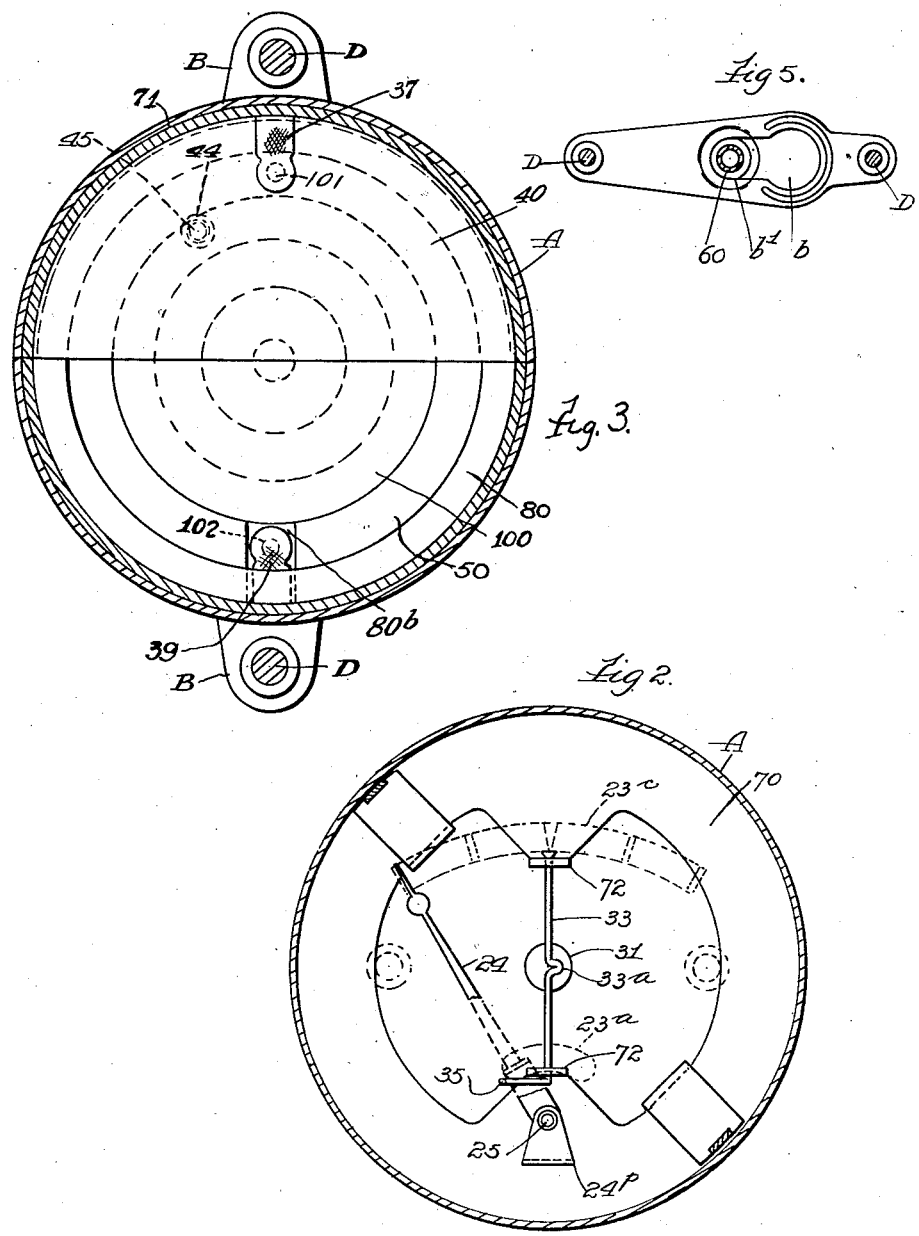

Patented Oct. 6, 1931

1,825,708

UNITED STATES PATENT OFFICE

LEONARD H. WHEELER, OF CHICAGO, ILLINOIS, ASSIGNOR TO STEWART-WARNER CORPORATION, OF CHICAGO, ILLINOIS, A CORPORATION OF VIRGINIA

DEPTH GAUGE AND PUMP

Application filed May 2, 1927. Serial No. 188,379.

The purpose of this invention is to provide an improved construction comprising a depth gauge and a pressure-responsive device by which the gauge is operated for indicating the depth of liquid in a tank with which the pressure-responsive device is connected, the same being particularly designed for indicating to the driver of a motor vehicle the depth of fuel remaining in the main supply tank at the rear of the vehicle.

A specific purpose of the invention is to provide a compact construction having both the gauge and pressure-actuated element assembled compactly as a substantially unitary construction in a unitary casing which may therefore be, all together, mounted in a convenient position on the vehicle. It consists of the elements and features of construction shown and described as indicated in the claims.

In the drawings:

Figure 2 is a partly sectional view of the nature of an elevation of the construction as seen looking in the direction of the arrow 2 on Figure 1 with the bezel ring and glass removed, the casing being shown in section as at the line 2—2 on Figure 1.

Figure 3 is a section at the staggered line 3—3 on Figure 1.

Figure 5 is a partly sectional view showing in elevation upon a smaller scale than Figure 1 a clamp device for clamping to an instrument board, the clamping bolts and central nipple which extend through the clamp bar being shown in section at the line 5—5 on Figure 1.

Figure 1:
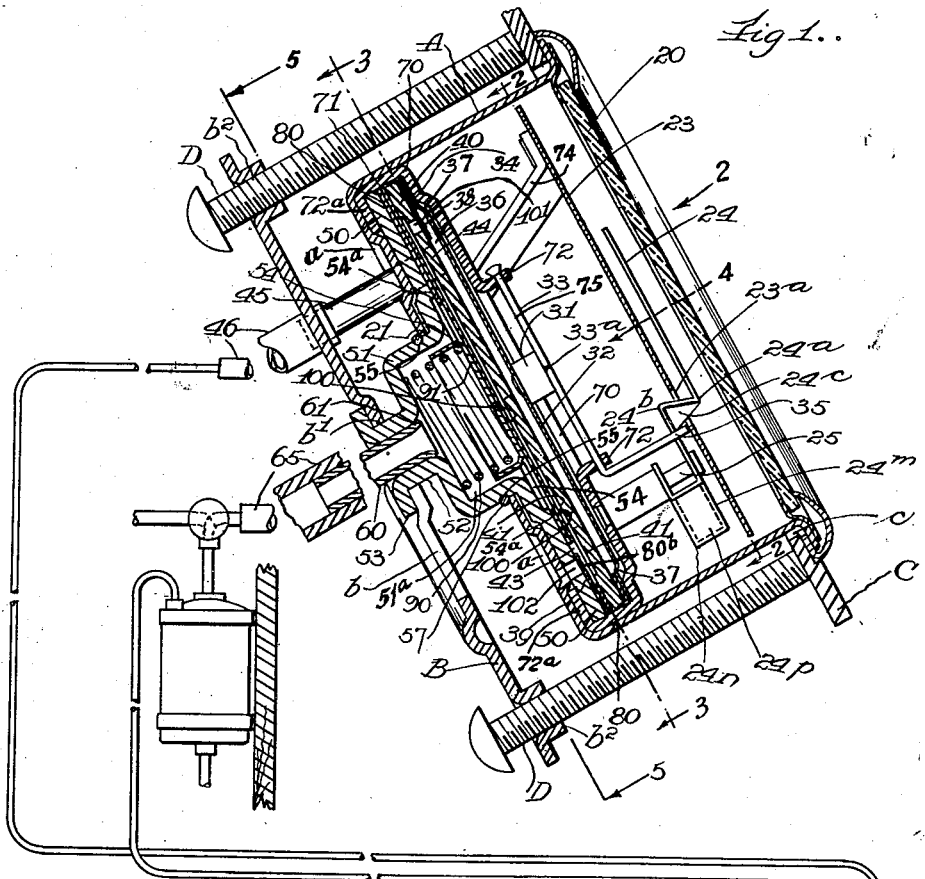
Figure 1 is an axial section of a construction embodying the invention shown diagrammatically in its position on the vehicle relative to the position of the fuel tank whose liquid content is to be indicated.

The structure illustrated comprises a casing A which is adapted to be mounted, as hereinafter more particularly described, at the dash of the vehicle, and, as illustrated, on the instrument board which is commonly present. The casing A is a sheet metal stamping in cup form with an open front shown closed by a bezel glass, 20, and having the back centrally apertured as seen at 21. Within the casing there are mounted two separate but co-operating elements which may be defined respectively as an indicator and a pressure-actuated and pressure-responsive element. The indicator comprises a graduated dial plate, 23, and index hand, 24, pivoted centrally with respect to the graduations of the dial for vibration in relation to said graduations. The index hand, 24, is mounted for its vibratory movement over the dial upon a post, 25, which is mounted rigidly on one of the parts, 70, of the pressure-actuated and pressure-responsive element hereinafter described. The post, 25, terminates at a short distance back of the dial plate, while the index hand is designed to vibrate over the dial in front of the dial plate. The index hand, therefore, has two right angle bends, $24^a$ and $24^b$ in opposite directions producing between them a short length, $24^c$ transverse to the plane of the dial plate, and the latter has an arcuate slot, $23^a$, properly located in the plate to accommodate the part $24^c$ of the index hand so that the index end of the hand may be positioned in front of the dial plate for its vibration over the graduated scale $23^c$.

This index hand, hereinafter referred to as the moving member of the indicator, is counterweighted by its formation from a metal strip folded twice at right angles in the same direction as seen at $24^m$ and $24^n$ forming a loop, $24^p$, extending at the opposite side of the fulcrum on the post, 25, from the end constituting the index or pointer, the relative dimensions of the parts at opposite sides of the fulcrum being such as to cause the hand to be but slightly overbalanced on the side of the index, so that it falls to the zero position with respect to the graduated scale when free from any action of the pressure-responsive element moving or holding it in the other direction. For actuating the index hand there is provided a lever arm extending integrally from a rock shaft, 33, formed of round rod having a U-shaped bend, $33^a$, intermediate two points of its length at which it is pivoted as hereinafter described. Said lever arm formed by bending the rod at right angles, projects past the portion of the indicator hand, 24, between its fulcrum on the post, 25, and the first right angle bend, 24ᵇ, for extending up through the arcuate slot, 23ᵃ, and at the side of said hand toward the zero point of the graduated scale. Pivot and fulcrum bearings for this lever member are formed by lugs, 72—72, struck up from the member, 70, hereinafter more particularly described, of the pressure-responsive element; and the actuation of said lever member, 35, is performed by a button, 31, mounted upon an elastic diaphragm, 32, of said pressure-responsive and pressure-actuated element, which in its entirety is mounted in the casing A at the back or bottom part thereof, the forward or upper part being occupied by the gauge device comprising the parts already described.

The pressure-actuated and pressure-responsive element comprises three plate members which as shown are sheet metal stampings assembled together in fixed relation, as hereinafter described as a unit for forming in them or between them and between the uppermost of them and the elastic diaphragm, 32, chambers having yielding walls for rendering the chambers expansible and reducible by and in accordance with varying fluid pressures introduced and produced in said chambers. These three metal stamping plates include a plate, 40, which is a plain circular disk, and a plate, 50, which is a circular disk having a centrally outstruck hollow boss, 51, with a further outstruck and central neck or stem, 52, flanged at its outer end at 53 and adapted for receiving a pipe nipple, 60, which is inserted through and expanded in the part 52, as seen at 61 for holding it permanently joined to said member 50. The third plate element of the pressure actuated and pressure-responsive unit is the part 70 stamped first in cup form interiorly diametered for snug fit therein of the parts 40 and 50, and having its flange wall, 71, dimensioned for being infolded as seen at 72ᵃ for clasping the margin of the plate, 50, and clamping together the two plates 40, and 50, between whose circumferential margins an annular packing gasket, 80, shown as two-ply material, is interposed for spacing them apart and forming between them a thin chamber, 43, made air-tight by said gasket, 80. The chamber, 43, thus formed by spacing apart the two plates 40 and 50 is increased in capacity by recesses on the inner faces of the plates 40 and 50, the recess on the plate, 40, being seen at 41 and being of uniform depth extending over substantially the entire area of the plate within the gasket 80. The recess in the plate, 50, is seen at 54, extending into and comprising the cavity 51ᵃ of the boss 51 and being of slightly greater diameter than said boss, but shallow in the annular part, 54, outside the boss cavity. Said boss cavity serves as a housing for a compression spring, 90, which seats at one end on the bottom of the boss cavity, and at the other end is provided with a hood, 91, nearly of the diameter of the boss cavity and having a flat upper web for seating against a diaphragm, 100, which is applied air-tight to the inner surface of the plate, 50, having a diameter enough greater than the diameter of the recess, 54, to obtain seating on the margin outside said recess where the outer ply of the two-ply gasket, 80, is cut away to afford an annular seat for said diaphragm upon the inner ply at the marginal portion of the latter, as seen at 54ᵃ so that it may completely close the chamber formed by the recess, 54, together with the cavity, 51ᵃ, of the boss, 51. On the upper or outer side of the upper plate, 40, there is applied the diaphragm, 32, above mentioned, made of thin spring sheet metal which is spaced from the plate, 40, by a gasket, 34, at its outer circumferential margin, said diaphragm and gasket being part of the entire assemblage which is clamped in the member, 70, by the infolding of the flange, 71; and there is thereby formed an air-tight chamber, 36, between the plate, 40, and said spring diaphragm, 32, which chamber is increased beyond the thickness of the gasket, 34, by the form of the diaphragm, 32, which is slightly dished as indicated at 37. At the center of its circular area it is formed for seating the button, 31, as above mentioned, which is permanently secured thereto in any suitable manner.

The plate, 40, has an aperture, 44, at which there is connected a pipe nipple, 45, which extends air-tight through the plate, 50, and protrudes through the bottom web of the casing A for coupling to its protruding end a pipe leading to the tank whose liquid content is to be indicated, as more particularly hereinafter described.

It will be observed that the diaphragm, 100, is substantially less in diameter than the recess, 41, which forms the chamber between said diaphragm and the plate, 40; and the annular area outside of that chamber outside the secured margin of the diaphragm, 100, affords convenient location for ports, 102 and 101, in the plates 50 and 40, respectively, leading respectively from the atmosphere into the chamber 41, 43 and from the chamber 41, 43 into the chamber, 36, said ports being controlled respectively by check valves, 39 and 38, opening for air inflow through the chamber, 41, 43, into the chamber, 36 and seating against outflow, the gasket, 80, being cut away through both plies, as seen at 80ᵇ, to uncover the port, 102, and at the inner ply to admit the secured end of the flat valve, 39, which at its free end vibrates in the cut away space of both plies.

The entire unit comprising the three plates, 40, 50 and 70, with the diaphragms, 32 and 100, and the spring, 90, with its hood, 91, is dimensioned, as above stated, for snug fit within the casing A and for protrusion of the boss, 51, through the central aperture in the back or bottom web of said casing; and for securing the entire unit when thus inserted in the casing there is formed on the outer side of the boss, 51, an annular groove, 55, for seating a spring-retaining ring, 57, the groove being located so that the ring lodged therein is stopped against the back or outer side of the casing when the unit is seated snugly, as stated, in the bottom of the casing. For thus seating the plate, 50, on the bottom of the casing, notwithstanding the inturned flange, 72$^a$, of the plate, 70, and for stiffening the web of the casing, the casing is formed with an inwardly or upstruck annular boss, $a$, diametered so as to stand within said inturned flange.

For mounting the entire structure on the instrument board there is provided a clamp bar, B, enough longer than the diameter of the casing to project past the latter at both ends when the bar is connected as hereinafter described by engagement of its middle point with the flange 53 of the neck or stem 52. For so engaging the bar after the casing has been inserted through the aperture, $c$, provided in the instrument board, C, the bar, B, has an aperture, $b$—$b^1$, diametered at the part, $b$, for admitting the flange, 53, and extended at the part $b^1$ with a lesser diameter for fitting the neck or stem, 52; so that when the flange has been introduced through the larger portion, $b$, of the aperture, the bar being moved longitudinally for engaging the smaller portion, $b^1$, with the neck, 52, the bar is locked behind the flange, 53. The ends of the bar are provided with threaded apertures, $b^2$—$b^2$, for clamping bolts, D, which are screwed through the bar alongside the casing for pinching the margin of the aperture, $c$, of the instrument board against the flange, $a$, of the casing, thereby clamping the entire structure securely to the instrument board.

The operation of this construction may be understood from the foregoing description as being that when the structure is mounted, as described, on the instrument board, the pipe nipple, 60, is connected by a hose or flexible pipe, 65, with a source of alternating higher and lower pressures, as the intake manifold of the engine, or the vacuum chamber of a vacuum tank when the vehicle is so provided for feeding the carbureter. The nipple, 45, is then connected by suitable flexible pipe, 46, which leads to the fuel supply tank in which it is intruded into the liquid contents of the tank the depth above which the content of the tank is to be measured and indicated by the indicator.

When thus mounted and connected, it will be understood that the alternation of higher and lower fluid pressures derived from the intake manifold or from the vacuum tank will produce a pumping action due to the reduction of the cavity or chamber, 41, 43, over the lesser diaphragm, 100, causing air to be drawn in through the port, 102, followed by the expansion of said chamber causing said diaphragm, 100, to force the air out through the port, 101, into the chamber, 36, under the diaphragm, 32, expanding said chamber and causing said diaphragm, 32, by means of the button, 31, to operate the lever, 35, causing it to actuate the index hand, 24, moving it from zero position over the graduated scale, 23$^c$, a distance corresponding to the pressure and resultant expansion of the chamber, 36, under the diaphragm, 32; and simultaneously with this action the pressure produced in the chamber, 36, is communicated through the nipple, 45, and pipe connection, 46, to the liquid which will initially be standing in said pipe to the depth of the liquid contents of the tank, and will force the liquid down in said pipe and out through the lower end thereof back into the cavity of the tank; and it will be understood that the repetition of alternating higher and lower pressures will eventually produce in the chamber 36 under the diaphragm, 32, and in the pipe connection therefrom to the fuel tank a sufficient pressure to expel all liquid from the pipe, 46; whereupon any further pressure will cause the compressed air to escape from the lower end of that pipe and bubble up through the liquid in the tank to the top, where it is exposed to atmospheric pressure. And thus the maximum pressure which can be produced in the chamber, 36, under the diaphragm, 32, for causing that diaphragm through the lever, 35, to actuate the index hand, 24, of the indicator, will correspond to and thereby be the measure of the depth of the liquid in the tank, which depth, therefore, will be shown by the indicator, the same having been properly calibrated in accordance with the form and dimensions of the tank.

Figure 4:
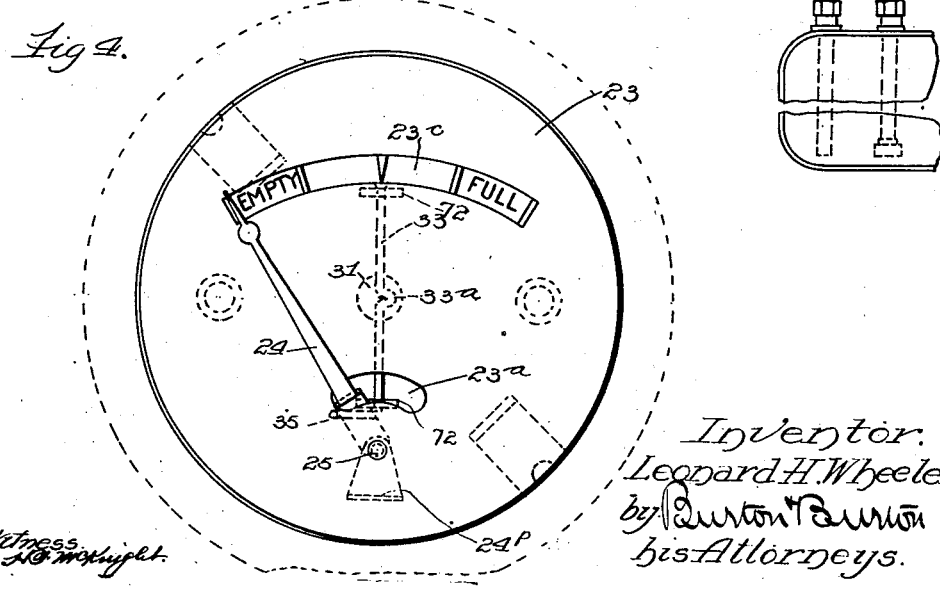
Figure 4 is an elevation looking in the direction of the arrow 4 on Figure 1 with the bezel ring and glass therein removed.

A convenient and economical formation of the plate, 70, for journalling the rock shaft, 33, for fulcruming the lever, 35, on the plate, 70, as mentioned, may be understood from Figures 1 and 4, consisting in that lugs, 72—72, for journalling said rock shaft and fulcruming said lever, and also a bracket arm, 74, for supporting the dial plate, are struck and folded up from and thereby form the aperture, 75, in the plate, 70, through which the button 31, which actuates the lever by engaging the bend, 33$^a$, of the rock shaft protrudes for such engagement.

The gauge may be calibrated for tanks which are to be filled to a depth of from six to twenty inches by bending the loop, 33$^a$, of the rock shaft, 33, toward or away from the button, 31, of the diaphragm, 32.

I claim:

1. A device for the purpose indicated comprising a casing and a pressure-responsive element therein including a plate having at its opposite sides a first and a second diaphragm between which diaphragm and the respectively proximate surfaces of the plate, a first and second chamber, expansible and reducible by flexure of the diaphragms respectively, are enclosed; means yieldingly resisting the expansion of said chambers respectively and tending to reduce the same when expanded; the casing and the plate of the pressure-responsive element having ports affording access of air to the first chamber through the second, and valve means controlling said ports opening for air inflow and seating against outflow; a conduit communicating with the first chamber adapted for communicating with the bottom of the liquid whose depth is to be indicated; means for alternating higher and lower fluid pressures on the outer side of the second diaphragm, and an indicating device having a moving member and means operatively connecting its moving member with said first diaphragm for actuation thereby.

2. In a construction for the purpose indicated in combination with a casing having an opening, a pressure indicator comprising a plate having graduated scale and a co-operating index member, one of said parts being fixed and the other movable with respect to the first; a pressure-responsive device mounted in the casing and comprising a chamber having a moving wall and means operatively connecting said wall with the moving member of the indicator, and further comprising a pair of plates one of which forms the fixed wall of the first mentioned chamber, said plates mounted face to face and having in their facing surfaces recesses facing each other to form a chamber; a flexible diaphragm closing one of said recesses and partitioning the space of said recesses into second and third chambers, the plates having ports for air access to the first mentioned chamber through the second chamber; valve means controlling said air access opening for air inflow and closing against outflow; a conduit adapted for connection to lead from the bottom of the liquid whose depth is to be indicated, said conduit opening in the first chamber, and means for alternating higher and lower fluid pressures in said third chamber for action on said partitioning diaphragm to alternatively diminish and increase the capacity of the second chamber and pump air into the first chamber for transmitting pressure through said conduit to the liquid at the intake thereof.

3. A device for the purpose indicated consisting of a plate and first and second flexible diaphragms between which the plate is interposed and which constitute respectively yielding walls of first and second chambers separated by the plate; a pressure-indicating device comprising a movable member, constructed for normally moving to and standing at one limit of its range of movement, and means connecting the movable member with said first diaphragm for operating yieldingly on said first diaphragm for following the movement in the direction for reducing its chamber; means forming a third chamber at the opposite side of said second diaphragm from said plate; the chamber walls having ports for admission of air through the second chamber into the first, and check valves controlling said ports opening for inflow and seating against outflow; a conduit opening in the first chamber adapted for connection to lead from the bottom of the liquid body whose depth is to be measured whereby when said conduit is so connected fluid pressure may be developed in said first chamber and communicated to said conduit corresponding to the hydrostatic pressure of the liquid above the intake of said conduit therein.

4. In the construction defined in claim 2, the third chamber comprising a cavity of an outstruck boss at the center of the second plate, the second mentioned diaphragm being mounted on said plate over and closing said cavity, and a compression spring housed in said cavity reacting on said diaphragm for enlarging the capacity of said third chamber and reducing the capacity of the second chamber.

5. In a construction for the purpose indicated, a pressure-responsive device comprising two plates of substantially equal diameters mounted concentrically, a packing gasket interposed between the plates at their margins for spacing them and rendering air tight the chamber thus formed between them, said plates having in their opposed faces recesses to increase the capacity of the chamber space between them, one of said plates having a hollow boss whose cavity constitutes part of the recess of said plate, said boss being outstruck at the center of said plate and formed for receiving a pipe connection; and a third member annular and cup-shaped in form dimensioned for encompassing and circumferentially fitting about said two plates and having the margin of its cup wall clinched inwardly upon said two plates fitted within it; said third member having means projecting from its inner circumferential margin, an indicating element of the pressure indicator mounted upon said means.

6. In a construction for the purpose indicated in combination with a casing having an open front, a fluid-pressure-operating and fluid-pressure-developing device, and a pressure-responsive and pressure-indicating device connected for transmission thereto of the pressures developed in the first mentioned device and mounted in the front part of the casing; said pressure-indicating means comprising a dial plate exposed at the front opening of the casing, and pressure-communicating connections to the fluid-pressure-developing device from the liquid body whose depth is to be indicated; the fluid-pressure-operating and fluid-pressure-developing element comprising a plate upon which the parts constituting the pressure-responsive and pressure-indicating elements are mounted, said plate having for such mounting, parts struck from it forming an aperture in it and comprising lugs adapted to constitute fulcra, an actuating element for the pressure-indicating means, said plate having an aperture affording access from said fluid-pressure-operated element to said actuating element.

7. In a construction for the purpose indicated, in combination with a casing having an open front, a fluid-pressure-operated and fluid-pressure-developing device mounted at the back of the casing; a pressure-responsive and pressure-indicating device connected for transmission thereto of the pressure developed in the first mentioned device and mounted in the front part of the casing; the pressure-indicating device being exposed at the front opening of the casing, and pressure-communicating connections to the fluid-pressure-developing device from the liquid body whose depth is to be indicated; the fluid-pressure-operated and responsive device having an expansible and reducible chamber comprising a rigid member forming one wall and a flexible diaphragm forming a cooperating wall of said chamber; a second rigid member arranged to hold the flexible diaphragm fluid-tight to said rigid cooperating wall; and a third rigid member made in cup form having the flanged wall of its cup form dimensioned as to interior diameter for receiving closely fitted therein the first and second rigid members and marginally infolded to embrace said two rigid members and hold them clamped together.

8. In a construction for the purpose indicated, in combination with a casing having an open front, a fluid-pressure-operated and fluid-pressure-developing device mounted at the back of the casing; a pressure-responsive and pressure-indicating device connected for transmission thereto of the pressure developed in the first mentioned device and mounted in the front part of the casing, the pressure-indicating device being exposed at the front opening of the casing, and pressure-communicating connections to the fluid-pressure-developing device from the liquid body whose depth is to be indicated; the fluid-pressure-operated and responsive device comprising three rigid members of which two are mounted face to face and formed for enclosing between them a cavity; a flexible diaphragm partitioning said cavity; the third rigid member being made in cup form interiorly dimensioned as to the diameter of its cup form for receiving said two rigid members and having the encompassing wall of its cup form infolded embracing said two rigid members and holding them clamped together, one of said two rigid members having an outstruck inwardly hollow central boss, the casing having an aperture in its rear wall dimensioned for said boss to fit therein and protrude out therefrom.

9. In a construction for the purpose indicated, in combination with a casing having an open front, a fluid-pressure-operated and fluid-pressure-developing device mounted at the back of the casing; a pressure-responive and pressure-indicating device connected for transmission thereto of the pressure developed in the first mentioned device and mounted in the front part of the casing; the pressure-indicating device being exposed at the front opening of the casing, and pressure communicating connections to the fluid-pressure-developing device from the liquid body whose depth is to be indicated; the fluid-pressure-operated and responsive device having an expansible and reducible chamber comprising a rigid member forming one wall, and the flexible diaphragm forming a cooperating wall of said chamber; a second rigid member arranged to hold the flexible diaphragm fluid-tight to said rigid cooperating wall, and a third rigid member formed for embracing the said two members and holding them in fixed relation to each other, said third member having at the back or outer side of said two members an outstruck inwardly hollow boss, the casing having an aperture in it rear wall dimensioned for said boss to fit therein and protrude out therethrough.

In testimony whereof I have hereunto set my hand at Chicago, Illinois, this 25th day of April, 1927.

LEONARD H. WHEELER.